(12) United States Patent
Sunkara et al.

(10) Patent No.: US 7,244,790 B2
(45) Date of Patent: Jul. 17, 2007

(54) THERMOPLASTIC ELASTOMER BLEND, METHOD OF MANUFACTURE AND USE THEREOF

(75) Inventors: Hari Babu Sunkara, Hockessin, DE (US); Herbert Vernon Bendler, Wilmington, DE (US); Howard C. Ng, Kingston (CA); Chun Sing Wong, Kingston (CA)

(73) Assignee: E.I. du Pont de Nemours and Company, Wilmington, DE (US)

( * ) Notice: Subject to any disclaimer, the term of this patent is extended or adjusted under 35 U.S.C. 154(b) by 208 days.

(21) Appl. No.: 11/120,056

(22) Filed: May 2, 2005

(65) Prior Publication Data

US 2006/0247380 A1   Nov. 2, 2006

(51) Int. Cl.
*C08L 75/08* (2006.01)
*C08F 120/06* (2006.01)

(52) U.S. Cl. .............................. 525/327.4; 525/327.5; 525/460; 525/461; 525/462; 525/236.1; 526/317.1; 427/384

(58) Field of Classification Search .............. 525/327.4, 525/327.5, 460, 461, 462, 326.1; 526/317.1; 427/384
See application file for complete search history.

(56) References Cited

U.S. PATENT DOCUMENTS

| | | | |
|---|---|---|---|
| 2,520,733 | A | 8/1950 | Morris et al. |
| 3,326,985 | A | 6/1967 | Mason |
| 3,896,078 | A | 7/1975 | Hoeschele |
| 4,275,180 | A | 6/1981 | Clarke |
| 4,981,908 | A | 1/1991 | Wolfe, Jr. |
| 5,015,789 | A | 5/1991 | Arntz et al. |
| 5,276,201 | A | 1/1994 | Haas et al. |
| 5,284,979 | A | 2/1994 | Haas et al. |
| 5,334,778 | A | 8/1994 | Haas et al. |
| 5,364,984 | A | 11/1994 | Arntz et al. |
| 5,364,987 | A | 11/1994 | Haas et al. |
| 5,633,362 | A | 5/1997 | Nagarajan et al. |
| 5,686,276 | A | 11/1997 | Laffend et al. |
| 5,821,092 | A | 10/1998 | Nagarajan et al. |
| 5,962,745 | A | 10/1999 | Brossmer et al. |
| 6,140,543 | A | 10/2000 | Brossmer et al. |
| 6,232,511 | B1 | 5/2001 | Haas et al. |
| 6,235,948 | B1 | 5/2001 | Sunkara et al. |
| 6,277,289 | B1 | 8/2001 | Kurian et al. |
| 6,297,408 | B1 | 10/2001 | Haas et al. |
| 6,331,264 | B1 | 12/2001 | Kurian et al. |
| 6,342,646 | B1 | 1/2002 | Haas et al. |
| 6,590,065 | B1 | 7/2003 | Goldfinger |
| 6,599,625 | B2 | 7/2003 | Goldfinger et al. |
| 6,720,459 | B2 | 4/2004 | Sunkara et al. |
| 7,144,958 | B2 * | 12/2006 | Chen .......................... 525/183 |
| 2002/0004568 | A1 | 1/2002 | Cohen et al. |
| 2002/0007043 | A1 | 1/2002 | Sunkara et al. |
| 2002/0010374 | A1 | 1/2002 | Sunkara et al. |
| 2004/0115450 | A1 | 6/2004 | Bendler et al. |
| 2004/0152925 | A1 | 8/2004 | Sunkara et al. |
| 2004/0225107 | A1 | 11/2004 | Sunkara et al. |
| 2004/0225161 | A1 | 11/2004 | Sunkara et al. |
| 2004/0225162 | A1 | 11/2004 | Sunkara et al. |
| 2004/0225163 | A1 | 11/2004 | Sunkara et al. |
| 2004/0260125 | A1 | 12/2004 | Seapan et al. |
| 2005/0020775 | A1 | 1/2005 | Wu et al. |
| 2005/0020805 | A1 | 1/2005 | Sunkara et al. |
| 2005/0282966 | A1 | 12/2005 | Sunkara et al. |
| 2005/0283028 | A1 | 12/2005 | Sunkara et al. |

FOREIGN PATENT DOCUMENTS

| | | |
|---|---|---|
| EP | 0 095 919 A2 | 12/1983 |
| EP | 0 274 888 A1 | 7/1988 |
| EP | 0 337 976 B1 | 10/1989 |
| EP | 0 393 409 B1 | 10/1990 |
| GB | 1 208 585 | 10/1970 |
| WO | WO 2005/042624 A1 | 5/2005 |

OTHER PUBLICATIONS

Coran, A.Y.; Patel, R.P. and Williams, D., "Rubber-Thermoplastic Compositions. Part V. Selecting Polymers for Thermoplastic Vulcanizates", Oct. 13-16, 1981, pp. 116-136, Monsanto Company, Rubber Chemicals Div., Akron, Ohio, USA.
DuPont ETPV, Engineering Thermoplastic Vulcanizates, Application Profile, Automotive: E-04/001, "Making Better Air Brake Hoses . . . for Less", The E.I. du Pont de Nemours & Co. website, 2004; http://www.dupont.com/enggpolymers/etpv/etpv_lit.html.
DuPont ETPV, Engineering Thermoplastic Vulcanizates, "Extrusion Guide", pp. 1-5, The E.I. du Pont de Nemours & Co. website, 2004; http://www.dupont.com/enggpolymers/etpv/etpv_lit.html.

(Continued)

*Primary Examiner*—Robert D. Harlan

(57) ABSTRACT

The present invention relates to a curable thermoplastic elastomeric composition based on a polytrimethylene ether ester elastomer and a crosslinkable poly(meth)acrylate rubber system; and a melt processible thermoplastic elastomeric compositions based on a continuous phase comprising of a polytrimethylene ether ester elastomer and a disperse phase of a crosslinked poly(meth)acrylate rubber. A process for manufacturing such a melt processible thermoplastic elastomeric composition, and a shaped article (e.g. an extruded or molded article) made therefrom, are also disclosed.

27 Claims, No Drawings

OTHER PUBLICATIONS

DuPont ETPV, Engineering Thermoplastic Vulcanizates, "Product and Properties Guide", pp. 1-8, The E.I. du Pont de Nemours & Co. website, 2004; http://www.dupont.com/enggpolymers/etpv/etpv_lit.html.

DuPont ETPV, Engineering Thermoplastic Vulcanizates, "Injection Molding Guide", pp. 1-4, The E.I. du Pont de Nemours & Co. website, 2004; http://www.dupont.com/enggpolymers/etpv/etpv_lit.html.

* cited by examiner

THERMOPLASTIC ELASTOMER BLEND, METHOD OF MANUFACTURE AND USE THEREOF

FIELD OF THE INVENTION

The invention relates to melt processible thermoplastic elastomeric blends, their manufacture, and their use in shaped or molded rubber articles.

BACKGROUND OF THE INVENTION

For many applications in the petroleum and automotive industries there is a need for elastomeric materials with good oil resistance at elevated temperatures. There is a particular need for materials that are flexible and soft (low in hardness) with good resistance to heat and compression set.

It is generally known in the art to employ curable polyacrylate elastomers to manufacture high performance rubber parts having excellent resistance to lubricating oils and greases which are therefore useful in selected automotive applications and the like. The gum rubber vulcanizates are either polyacrylate elastomers derived from copolymerization of acrylic acid ester monomers (e.g., ethyl, butyl, and methoxyethyl acrylate and can include some vinyl acetate), polyethylene/acrylate elastomer derived from copolymerization of ethylene monomer and acrylic acid ester monomers (e.g. ethylene and methyl acrylate and can include other comonomers and grafts, see for example U.S. Patent Publication No. 2002/0004568 A1 incorporated herein by reference), or polyperfluoroalkyl acrylate elastomer derived from polymerization of fluorinated acrylic ester monomer (e.g., 1,1 dihydroperfluoro-n-butyl acrylate). The polyacrylate elastomers also can be functionalized by incorporating a relatively small amount of an additional comonomer such as an acrylate glycidyl ester, maleic acid or other comonomer having a reactive group including acid, hydroxyl, epoxy, isocyanate, amine, oxazoline, chloroacetate or diene. These functionalized polyacrylate elastomers can then be cured using a curative co-agent containing functional groups that covalently bond to the functionalized reactive sites of the polyacrylate elastomer.

One problem associated with the prior art curable polyacrylate elastomers is the inherent rheological limitations of high viscosity and low melt flow of their cured or partially cured state. Consequently, physical blending followed by compression molding and subsequent curing is usually necessary to achieve acceptable properties rather than extrusion or injection molding directly to a finished part (as discussed above). However, in European Patent 0 337 976 B1 and in U.S. Pat. No. 4,981,908 thermoplastic elastomer compositions are disclosed comprising blends of polyester resin (including segmented polyether ester elastomers commercially available under the trademark HYTREL® (E. I. du Pont de Nemours and Company, Wilmington, Del. ("DuPont")) and dynamically vulcanized, covalently cross-linked acrylate rubber (including ethylene/methyl acrylate terpolymer containing about one mole percent of a carboxylic acid containing comonomer, commercially available under the trademark VAMAC®. (DuPont). The covalent cross-linking in these disclosures is achieved by employing a functionalized polyacrylate elastomer in combination with reactive difunctional cross-linking agent. However, almost all of these difunctional cross-linking agents can also react with the ester units in the polyalkylene phthalates (i.e., an amine, hydroxyl or carboxylic acid group will exchange with the ester groups and epoxy or acid groups will add to the hydroxyl end groups), which leads to high viscosity and lack of reproducibility.

In U.S. Patent Application Publication No. 2004/0115450 there is disclosed a curable thermoplastic elastomeric blend comprising a polyalkylene phthalate polyester polymer or copolymer and a crosslinkable poly(meth)acrylate or ethylene/(meth)acrylate copolymer vulcanizate rubber in combination with a peroxide free-radical initiator and an organic multiolefinic coagent to crosslink the rubber during extrusion or injection molding of the blend. It is taught there that the polyester hard segment blocks in the copolymer should have high melt temperatures to obtain useful elastomeric blends for high temperature service. However, it is generally found that hard segment high melt temperatures increase polymer hardness and reduce flexibility.

It is an objective of the present invention to provide softer and more flexible thermoplastic elastomeric blends which provide excellent resistance to heat and compression set, to a process for making such elastomeric blends, and to shaped or molded articles made from such blends.

SUMMARY OF THE INVENTION

It has now been found that curable thermoplastic elastomeric compositions can be made using a polytrimethylene ether ester elastomer, cross-linkable poly(meth)acrylate rubber, and crosslinking system to crosslink the rubber. The curable thermoplastic compositions are amenable to dynamic crosslinking during the extrusion or injection molding of the starting components, resulting in a melt processible thermoplastic elastomeric compositions having a crosslinked poly(meth)acrylate rubber as the dispersed phase and polytrimethylene ether ester elastomer as the continuous phase.

Thus, in one embodiment the present invention is a curable thermoplastic elastomeric composition comprising:
(a) polytrimethylene ether ester elastomer;
(b) crosslinkable poly(meth)acrylate rubber; and
(c) a crosslinking system to crosslink the rubber.

The invention also provides a melt processible thermoplastic elastomeric composition comprising:
(a) a continuous phase comprising polytrimethylene ether ester elastomer; and
(b) crosslinked poly(meth)acrylate rubber disperse phase.

The present invention also provides a process for manufacturing a melt processible thermoplastic elastomeric composition comprising the steps:
(a) providing a cross-linkable poly(meth)acrylate rubber;
(b) providing crosslinking system in an amount effective to crosslink the poly(meth)acrylate rubber;
(c) providing polytrimethylene ether ester elastomer;
(d) forming a mixture of the cross-linkable poly(meth)acrylate rubber, the polytrimethylene ether ester elastomer and the crosslinking system;
(e) cross-linking the cross-linkable poly(meth)acrylate rubber in the mixture using the crosslinking system; and
(f) recovering a melt processible thermoplastic elastomeric composition comprising the polyether ester elastomer as a continuous phase and the crosslinked poly(meth)acrylate rubber as a disperse phase.

Preferably the cross-linking is carried out during extrusion or injection molding of the melt processible thermoplastic elastomeric composition.

Preferably the mixing is carried out a temperate of about 80 to about 130° C. Preferably the crosslinking is carried out a temperate of about 180 to about 275° C.

In yet another embodiment the invention also provides a shaped article (e.g., an extruded or molded article) made from a melt processable thermoplastic elastomeric composition comprising:

(a) a continuous phase comprising polytrimethylene ether ester elastomer; and (b) a disperse phase comprising cross-linked poly(meth) acrylate rubber. Preferably the shaped article is selected from the group consisting of hoses, gaskets, films, belts, cable jackets, seals, gears and bearings.

The invention is also directed to a process of preparing a shaped article comprising: (a) providing a melt processable thermoplastic elastomeric composition comprising: (i) polytrimethylene ether ester elastomer; (ii) crosslinkable poly (meth)acrylate rubber; and (iii) a crosslinking system to crosslink the rubber; and (b) forming a shaped article by extruding or molding the melt processable thermoplastic elastomeric composition. Preferably the forming a shaped article is carried out by extrusion or injection molding of the melt processable thermoplastic elastomeric composition.

The polytrimethylene ether ester elastomer preferably comprises from about 10 to about 90 wt. %, more preferably from about 30 to about 70 wt. %, poly(trimethylene ether) terephthalate soft segment and from about 90 to about 10 wt. %, more preferably from about 70 to about 30 wt. % polyalkylene phthalate hard segment (by weight of the polytrimethylene ether ester elastomer).

Preferably the polytrimethylene ether ester elastomer is a block copolymer.

Preferably the polytrimethylene ether ester elastomer comprises polytrimethylene ether ester soft segment and polyalkylene phthalate hard segment.

Preferably the polyalkylene phthalate hard segments are preferably selected from the group consisting of poly(ethylene terephthalate), poly(trimethylene terephthalate), poly (butylene terephthalate), and copolymers and mixtures thereof.

Preferably the polytrimethylene ether glycol has number average molecular weight of at least about 1,000, more preferably about 1,000 to about 5,000.

The polyalkylene phthalate hard segments are preferably selected from the group consisting of poly(ethylene terephthalate), poly(trimethylene)terephthalate, poly(butylene) terephthalate, and copolymers (i.e., polyesters made from one or more diol selected from the group consisting of ethylene glycol, 1,3-propanediol, and 1,4-butanediol) and mixtures thereof.

In a preferred embodiment, the polytrimethylene ether ester elastomer is prepared by providing and reacting (a) polytrimethylene ether glycol, (b) diol comprising a member of the group consisting of 1,4-butanediol, 1,3-propanediol and ethylene glycol, and (c) terephthalic acid, ester, acid halide or acid anhydride.

In a preferred embodiment, the polytrimethylene ether ester elastomer is prepared by polycondensation produced by polycondensation of diol comprising 50 to 100 wt %, preferably 75 to 100 wt. %, even more preferably 98 to 100 wt % (e.g., 100 wt %) 1,3-propanediol and 50 to 0 wt %, preferably 25 to 0 wt %, even more preferably 2 to 0 wt % (e.g., 0 wt %), other diols having from 2 to 12 carbon atoms. Preferably the other diols are selected from the group consisting of 1,4-butanediol and ethylene glycol.

In one preferred embodiment, the polyether ester elastomer is a block copolymer of segments of poly(trimethylene ether)terephthalate soft segments and poly(butylene terephthalate) hard segments. In another preferred embodiment, the polyether ester elastomer is a block copolymer of segments of poly(trimethylene ether)terephthalate soft segments and poly(ethylene terephthalate) hard segments. In yet another preferred embodiment, the polyether ester elastomer is a block copolymer of segments of poly(trimethylene ether)terephthalate soft segments and poly(trimethylene terephthalate) hard segments.

Preferably the polytrimethylene ether ester has a Shore D hardness of 50 or less.

Preferably the Tm of the hard segment is at least 200° C. prior to blending.

Preferably, the 1,3-propanediol is derived from a fermentation process using a renewable biological source.

Preferably the crosslinkable poly(meth)acrylate rubber is selected from the group consisting of poly alkyl(meth) acrylate rubber, ethylene/alkyl(meth)acrylate copolymer rubber and polyperfluoroalkylacrylate rubber, and is most preferably an ethylene/alkyl acrylate copolymer rubber where the alkyl group has from 1 to 4 carbons.

Preferably the crosslinking system comprises a peroxide free radical initiator in combination with an organic multiolefinic coagent. The free radical initiator is preferably selected from the group consisting of 2,5-dimethyl-2,5-di-(t-butylperoxy)hexyne-3, t-butyl peroxybenzoate, 2,5-dimethyl-2,5-di-(t-butylperoxy)-2,5-dimethylhexane, dicumyl peroxide, α,α-bis(t-butylperoxy)-2,5-dimethylhexane, and mixtures thereof, and the organic multiolefinic co-agent is preferably selected from the group consisting of diethylene glycol diacrylate, ethylene glycol dimethacrylate, diethylene glycol dimethacrylate, polyethylene glycol dimethacrylate, N,N'-m-phenylene dimaleimide, and triallylisocyanurate.

DETAILED DESCRIPTION OF THE INVENTION

Applicants specifically incorporate the entire content of all cited references in this disclosure. Unless stated otherwise, all percentages, parts, ratios, etc., are by weight. Trademarks are shown in upper case. Further, when an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

In describing and/or claiming this invention, the term "copolymer" is used to refer to polymers containing two or more monomers. The use of the term "terpolymer" and/or "termonomer" means that the copolymer has at least three different comonomers. The term "(meth)acrylic acid" refers to methacrylic acid and/or acrylic acid, inclusively. Likewise, the terms "(meth)acrylate" and "alkyl(meth)acrylate" are used interchangeably herein and mean methacrylate and/or acrylate esters. "Poly(meth)acrylate" means polymers derived from the polymerization of either or a mixture of both corresponding type of monomers. The term "vulcanizate" and the phrase "vulcanizate rubber" as used herein are intended to be generic to the cured or partially cured, cross-linked or cross-linkable rubber as well as curable precursors of cross-linked rubber and as such include elastomers, gum rubbers and so-called soft vulcanizates as commonly recognized in the art. The use of the phrase "organic multiolefinic co-agent" is intended to mean organic co-agents that contain two or more olefinic double bonds. The phrase "rubber phase" and "thermoplastic phase" as used herein refer to and mean the polymeric morphological phases present in the resulting thermoplastic elastomeric blends derived from mixing and dynamic crosslinking of the cross-linkable (meth)acrylate rubber and the polyether ester starting materials, according to the method of the present invention. Likewise, the term "elastomer" is used herein to describe not only essentially amorphous materials, but also soft, partially-crystalline materials, often referred to as plastomers, which, in the case of ethylene copolymers, can contain as little as 6.5 mole % comonomer.

The curable thermoplastic elastomer blends according to the present invention involve the mixing of polytrimethylene ether ester elastomer and poly(meth)acrylate rubber in the presence of a crosslinking system. The polytrimethylene ether ester soft segment and polyalkylene phthalate hard segment is admixed with a cross-linkable poly(meth)acrylate or ethylene/alkyl(meth)acrylate copolymer rubber. The curable thermoplastic elastomer blend also contains a crosslinking system. More specifically, the crosslinking system preferably involves the combination of a free-radical initiator and an organic multiolefinic co-agent. The use of the free-radical initiator and multiolefinic co-agent results in a curable thermoplastic blend that can be dynamically cross-linked during melt blending and/or melt fabrication. Thus the curable thermoplastic elastomer blend is extruded, injection molded or the like and the free-radical initiator and multiolefinic co-agent acts as a curative agent/system resulting in cross-linking of the rubber, in situ, within the blend.

Preferably the compositions of the invention comprise from about 15 to about 75 wt. % polytrimethylene ether ester elastomer and from about 25 to about 85 wt. % poly(meth)acrylate rubber.

The resulting dynamically cross-linked product according to the invention will itself be a melt processable thermoplastic elastomer composition. As such, the cross-linked product will be thermoformable and recyclable. Typically the resulting melt processable thermoplastic elastomer will be more thermoplastic than its component rubber phase in the absence of the thermoplastic polyester phase and will be more elastic than the thermoplastic polyester phase in the absence of the rubber phase. Furthermore, the resulting melt processable thermoplastic elastomer composition will involve the polyether ester elastomer being present as a continuous phase while the poly(meth)acrylate or ethylene/alkyl(meth)acrylate copolymer cross-linked rubber will be present as the dispersed phase.

The compositions of this invention contain a crosslinking system to crosslink the rubber. The crosslinking system (and its components) is present in an amount effective crosslink the rubber. Preferably the crosslinking system is selected and is used in amounts sufficient to achieve slow rates of reaction and corresponding desirable high time at maximum G' rate (and can be quantified for the preferred embodiments as a time at maximum G' rate of equal to or greater than 3.9 minutes). G' rate is described in U.S. Pat. No. 2004/0115450 A1, which is incorporated herein by reference.

Preferably the crosslinking system comprises a peroxide free radical initiator in combination with an organic multiolefinic coagent. Preferably the crosslinking system comprises about 0.1 to about 5 weight %, preferably about 1 to about 5 weight %, most preferably about 1.5 to about 3 weight %, peroxide free radical initiator %, by weight of the rubber. Preferably the coagent is used in an amount of about 0.5 to about 8 weight %, preferably about 2 to about 6 weight %, by weight of the rubber.

Preferred free radical initiators for use in the invention decompose rapidly at the temperature of dynamic crosslinking but not at the melt temperature of mixing of the components. These include, for example, 2,5-dimethyl-2,5-di-(t-butylperoxy)hexyne-3, t-butyl peroxybenzoate, 2,5-dimethyl-2,5-di-(t-butylperoxy)-2,5-dimethylhexane, dicumyl peroxide, α,α-bis (t-butylperoxy)-2,5-dimethylhexane, and the like. Most preferable free-radical initiators are 2,5-dimethyl-2,5-di-(t-butylperoxy)hexyne-3; 2,5-dimethyl-2,5-di-(t-butylperoxy) hexane; and t-butyl peroxybenzoate.

The organic multiolefinic co-agents are preferably organic dienes. The co-agent can be, for example, diethylene glycol diacrylate, diethylene glycol dimethacrylate, N,N'-m-phenylene dimaleimide, triallylisocyanurate, trimethylolpropane trimethacrylate, tetraallyloxyethane, triallyl cyanurate, tetramethylene diacrylate, polyethylene glycol dimethacrylate, and the like. Preferably the co-agents are diethylene glycol diacrylate, diethylene glycol dimethacrylate, N,N'-m-phenylene dimaleimide, and triallylisocyanurate.

The cross-linkable polymeric rubbers useful in the present invention are acrylate-type rubbers. Typically such rubbers are linear copolymers derived by the copolymerization of more than one acrylic acid ester or methacrylic acid ester or mixtures thereof, or are derived by the copolymerization of ethylene and one or more acrylic acid ester or methacrylic acid ester or mixtures thereof. Where the acrylate rubber contains a major amount of ethylene, the acrylate can be little as 6.5 mole %, but for optimally low compression set the acrylate should be above 20 mole %. For purposes of this invention, such poly(meth)acrylates and ethylene/(meth)acrylate copolymers do not require the presence of a functionalized termonomer. However, it is contemplated that the mere presence of small amounts of intentionally added functionalized comonomer for specific end use properties is within the scope of the present invention provided that such functionality does not deleteriously affect the cure rate achieved during dynamic cross-linking by free-radical initiation. Also, it is contemplated that for purposes of this invention certain polyperfluoroalkyl acrylate (FPA) type polymers based on monomers such as 1,1-dihydroperfluoro-n-butyl acrylate and fluorinated copolymers derived from vinylidene fluoride and hexafluoropropylene should be considered equivalent to the acrylate-type rubbers. More preferably the cross-linkable acrylate rubber is a copolymer of ethylene and one or more alkyl esters of acrylic acid, methacrylic acid or mixtures thereof wherein the relative amount of ethylene copolymerized with the acrylic acid esters (i.e., the alkyl acrylate) is less than 80 weight percent and the alkyl acrylate represents greater than 20 weight percent of the copolymer.

Copolymers of ethylene and an acrylate ester are well known. They can be manufactured using two high-pressure free radical processes: tubular processes or autoclave processes. The difference in ethylene/acrylate copolymers made from the two processes is described in, e.g., "High flexibility EMA Made From High Pressure Tubular Process." Annual Technical Conference-Society of Plastics Engineers (2002), $60^{th}$(Vol. 2), 1832-1836.

Of note are copolymers of ethylene and methyl acrylate and copolymers of ethylene and butyl acrylate. Of particular note are copolymers of ethylene and methyl acrylate having from about 25 wt. % to about 40 wt. % of methyl acrylate. Also of particular note are copolymers of ethylene and butyl acrylate having from about 25 wt. % to about 40 wt. % of butyl acrylate. Especially noteworthy are such copolymers prepared by tubular processes. Tubular process ethylene/alkyl acrylate copolymers are commercially available from DuPont under the tradename ELVALOY® AC.

Also of note are copolymers (terpolymers) of ethylene, methyl acrylate, and a second alkyl acrylate (e.g., butyl acrylate). A particular embodiment provides a copolymer derived from copolymerization of ethylene, methyl acrylate comonomer, and n-butyl acrylate comonomer wherein the methyl acrylate comonomer is present in the copolymer from a lower limit of about 5 wt. % to an upper limit which varies linearly from about 45 wt. % when n-butyl acrylate is present at about 41 wt. % to about 47.5 wt. % when n-butyl acrylate is present at about 15 wt. % and wherein the n-butyl acrylate is present in said copolymer from a lower limit of about 15 wt. % when methyl acrylate is present within the range of about 23 to 47.5 wt. % and from a lower limit of about 57 wt. % when methyl acrylate is present at about 5 wt. % and from lower limit that varies linearly between the lower limit at about 5 wt. % of methyl acrylate and the lower limit of about 23 wt. % of methyl acrylate to an upper limit of about 41 wt. % when methyl acrylate is present at about 45 wt. % and to an upper limit of about 80 wt. % when methyl acrylate is present at about 5 wt. % and to an upper limit that varies linearly between about 45 and 5 wt. % methyl acrylate, and the remainder is ethylene.

Similarly, in another embodiment methyl acrylate is present in the copolymer at about 10 to 40 wt. % and n-butyl acrylate is present in the copolymer from a lower limit of about 15 wt. %, when methyl acrylate is present within the range of about 23 to 40 wt. %, and from a lower limit of about 47 wt. %, when methyl acrylate is present at about 10 wt. %, and from a lower limit that varies linearly between the lower limit at about 10 wt. % methyl acrylate and the lower limit at about 23 wt. % methyl acrylate to an upper limit of about 35 wt. %, when methyl acrylate is present at about 40 wt. % and to an upper limit of about 65 wt. %, when methyl acrylate is present at about 10 wt. %, and to an upper limit that varies linearly between about 40 and 10 wt. % methyl acrylate.

Especially notable are terpolymers wherein methyl acrylate is present in the terpolymer at about 15 to 30 wt. % and n-butyl acrylate is present in the copolymer from a lower limit of about 20 wt. %, when methyl acrylate is present within the range of about 27 to 30 wt. %, and from a lower limit of about 45 wt. %, when methyl acrylate is present at about 15 wt. %, and from a lower limit that varies linearly between the lower limit at about 15 wt. % methyl acrylate and the lower limit at about 25 wt. % methyl acrylate to an upper limit of about 45 wt. %, when methyl acrylate is present at about 30 wt. %, and to an upper limit of about 60 wt. %, when methyl acrylate is present at about 15 wt. %, and to an upper limit that varies linearly between about 30 and 15 wt. % methyl acrylate. These terpolymers are described in more detail in U.S. patent application Ser. No. 2005-0020775 A1, incorporated by reference herein in its entirety.

Alternatively, the cross-linkable acrylate rubber can comprise a mixture of two or more different ethylene/alkyl acrylate copolymers. A mixture of two or more ethylene/alkyl acrylate copolymers can be used in the present invention in place of a single copolymer as long as the average values for the comonomer content will be within the range indicated above. Particularly useful properties can be obtained when two properly selected ethylene/alkyl acrylate copolymers are used in blends of the present invention. For example, the cross-linkable acrylate rubber may comprise an ethylene/methyl acrylate copolymer mixed with an ethylene copolymer with a different alkyl acrylate (e.g. butyl acrylate). The different polyethylene/alkyl acrylate copolymers may both be prepared using autoclave processes, may both be prepared using tubular processes, or one may be prepared using an autoclave process and the other using a tubular process.

The polytrimethylene ether ester elastomer for use in the invention is preferably a block copolymer consisting of a hard segment of polyalkylene phthalate equivalent and a polyether ester soft segment based on long chain polytrimethylene ether glycols. The high melting hard segment blocks may crystallize at useful service temperatures to provide physical crosslinks in the elastomer while the low glass transition temperature and low melting point of the soft block provide elastomeric characteristics. The melting point of the hard segment ($T_m$) of the polyether ester elastomer (prior to blending) is preferably 200° C. or higher, based upon the major melt peak as determined using the method described below in the examples. With this invention it has been determined that the higher the $T_m$, the higher the service temperature. $T_m$ can be 250° C. or higher. Polytrimethylene ether ester elastomers for use in the invention contain about 90 to about 30 wt. % polytrimethylene ether ester soft segment and about 10 to about 70 wt. % polyester hard segment. Polytrimethylene ether ester elastomers of this composition and methods for their preparation are described in U.S. Pat. Nos. 6,599,625 and 6,590,065 and U.S. patent application Ser. No. 10/872,685, filed Jun. 21, 2004, all of which are incorporated herein by reference.

The polytrimethylene ether ester elastomer preferably has a Shore D hardness of about 50 or less, preferably about 45 or less. Shore D hardness can be as low as about 20. The melt processed product (e.g., an injected molded product), preferably has a Shore A hardness from about 30 to about 90.

The terms "polytrimethylene ether ester soft segment" and "soft segment" are used herein to refer to the reaction product of polymeric ether glycol and dicarboxylic acid equivalent which forms an ester connection, wherein at least 40 wt. % of the polymeric ether glycol used to form the soft segment is polytrimethylene ether glycol. Preferably at least 45 wt. %, more preferably at least 50 wt. %, even more preferably at least 85 wt. %, and most preferably about 95-100 wt. %, of the polymeric ether glycol used to form the soft segment is polytrimethylene ether glycol.

Up to 50 weight % of the soft segment, preferably no more than 10 weight %, may comprise polymeric ether glycol other than polytrimethylene ether glycol. Preferred are those selected from the group consisting of polyethylene ether glycol, polypropylene ether glycol, polytetramethylene ether glycol, polyhexamethylene ether glycol, and copolymers of tetrahydrofuran and 3-alkyl tetrahydrofuran. These other polymeric ether glycols preferably have a number average molecular weight of at least about 1,000, more preferably at least about 1,500, and preferably up to about 5,000, more preferably up to about 3,500.

A wide range of molecular weights of the polytrimethylene ether glycol can be used. Preferably the polytrimethylene ether glycol has a number average molecular weight (Mn) of at least about 1,000, more preferably at least about 1,500, and most preferably at least about 2,000. The Mn is preferably less than about 5000, more preferably less than about 4,000, and most preferably less than about 3,500. Polytrimethylene ether glycols useful for this invention are described in U.S. Patent Application Publication Nos. 2002/0007043 A1 and 2002/0010374 A1, which are incorporated herein by reference.

Methods for preparation of polytrimethylene ether glycol for use in preparing the polyether esters of the invention are disclosed in U.S. Pat. Nos. 2,520,733; 3,326,985; and 6,720,459; in U.S. Patent Application Publication Nos. 2002/0007043; 2004/0225162; 2004/0225163; 2004/0225107; 2004/0152925; and 2005/0020805 A1 and in U.S. patent application Ser. No.10/871,622, filed Jun. 18, 2004, all of which are incorporated herein by reference.

Dicarboxylic acid equivalents used for preparing the soft segment of the polyether ester elastomers include dicarboxylic acids, diesters of dicarboxylic acids, and diester-forming derivatives such as acid halides (e.g., acid chlorides) and anhydrides. Especially preferred are the dicarboxylic acid equivalents selected from the group consisting of dicarboxylic acids and diesters of dicarboxylic acids. More preferred are dimethyl esters of dicarboxylic acids.

Preferred are the aromatic dicarboxylic acids or diesters by themselves, or with small amounts of aliphatic or cycloaliphatic dicarboxylic acids or diesters. Most preferred are the dimethyl esters of aromatic dicarboxylic acids.

Representative aromatic dicarboxylic acids useful in the present invention include terephthalic acid, isophthalic acid, bibenzoic acid, naphthalic acid, substituted dicarboxylic compounds with benzene nuclei such as bis(p-carboxyphenyl)methane, 1,5-naphthalene dicarboxylic acid, 2,6-naphthalene dicarboxylic acid, 2,7-naphthalene dicarboxylic acid, 4,4'-sulfonyl dibenzoic acid, etc., and $C_7$-$C_{10}$ alkyl and other ring substitution derivatives such as halo, alkoxy or aryl derivatives. Hydroxy acids such as p-(hydroxyethoxy) benzoic acid can also be used providing an aromatic dicarboxylic acid is also present. Representative aliphatic and cycloaliphatic dicarboxylic acids useful in this invention are sebacic acid, 1,3- or 1,4-cyclohexane dicarboxylic acid, adipic acid, dodecanedioic acid, glutaric acid, succinic acid, oxalic acid, azelaic acid, diethylmalonic acid, fumaric acid, citraconic acid, allylmalonate acid, 4-cyclohexene-1,2-dicarboxylate acid, pimelic acid, suberic acid, 2,5-diethyladipic acid, 2-ethylsuberic acid, 2,2,3,3-tetramethyl succinic acid, cyclopentanenedicarboxylic acid, decahydro-1,5- (or 2,6-)naphthalene dicarboxylic acid, 4,4'-bicyclohexyl dicarboxylic acid, 4,4'-methylenebis(cyclohexylcarboxylic acid), 3,4-furan dicarboxylate, and 1,1-cyclobutane dicarboxylate. The dicarboxylic acid equivalents in the form of diesters, acid halides and anhydrides of the aforementioned aliphatic dicarboxylic acids are also useful to provide the polyether ester of the present invention. Representative aromatic diesters include dimethyl terephthalate, bibenzoate, isophthlate, phthalate and naphthalate.

Of the above, preferred are terephthalic, bibenzoic, isophthalic and naphthalic acid; dimethyl terephthalate, bibenzoate, isophthlate, naphthalate and phthalate; and mixtures thereof. Particularly preferred dicarboxylic acid equivalents are the equivalents of phenylene dicarboxylic acids (phthalic acids) especially those selected from the group consisting of terephthalic and isophthalic acid and their diesters, especially the dimethyl esters, dimethyl terephthalate and dimethyl isophthalate. In addition, two or more dicarboxylic acids equivalents can be used. For instance, terephthalic acid or dimethyl terephthalate can be used with small amounts of the other dicarboxylic acid equivalents.

In a preferred embodiment, at least 50 mole % (more preferably at least 70 mole %, even more preferably at least 85 mole % and most preferably about 95-100 mole %) of the dicarboxylic acid, ester, acid chloride or acid anhydride is selected from the group consisting of terephthalic acid and dimethyl terephthalate.

The hard segments of the polyether ester elastomers comprise polyester that is the reaction product of a phthalic acid equivalent as described above and at least one of ethylene glycol, 1,3-propanediol or 1,4-butanediol. Examples of phthalic acids are phthalic acid, isophthalic acid and terephthalic acid. Terephthalic acid or its equivalent is preferred. Polyester hard segments prepared from one or a mixture of these diols and terephthalic acid or its equivalents have the preferred melting point of at least about 200° C.

The hard segment can also be prepared with up to 50 mole % (preferably up to 25 mole %, more preferably up to 15 mole %), of diols other than ethylene glycol, 1,3-propanediol or 1,4-butanediol. These diols preferably have a molecular weight lower than about 400. They are preferably aliphatic diols and can be acyclic or cyclic. Preferred are diols with 5-15 carbon atoms such as, pentamethylene, 2,2-dimethyltrimethylene, 2-methyltrimethylene, hexamethylene and decamethylene glycols, dihydroxy cyclohexane, cyclohexane dimethanol, hydroquinone bis(2-hydroxyethyl) ether. Especially preferred are aliphatic diols containing 5-8 carbon atoms.

The 1,3-propanediol employed for preparing the polytrimethylene ether glycols can be obtained by any of the various chemical routes or by biochemical transformation routes. Preferred routes are described in U.S. Pat. Nos. 5,015,789, 5,276,201, 5,284,979, 5,334,778, 5,364,984, 5,364,987, 5,633,362, 5,686,276, 5,821,092, 5,962,745, 6,140,543, 6,232,511, 6235,948, 6,277,289, 6,297,408, 6,331,264 and 6,342,646, U.S. Pat. Nos. 5,633,362, 5,686,276, and 5,821,092, and U.S. Patent Application Publication Nos. 2004/0225161; 2004/0260125 and 2004/0225162, all of which are incorporated herein by reference in their entireties. The most preferred 1,3-propanediol is prepared by a fermentation process using a renewable biological source. Preferably the 1,3-propanediol used as the reactant or as a component of the reactant will have a purity of greater than about 99% by weight as determined by gas chromatographic analysis.

The actual mixing of components and subsequent dynamic cross-linking can be performed either in a batch mode or a continuous mode using conventional melt blending equipment as generally practiced in the art. Preferably, the process is performed continuously in a melt extruder or injection molding apparatus. The critical consideration is to perform the steps such that one takes advantage of the slow rate of cure at low temperatures, thus, achieving significant mixing and dispersion prior to cross-linking. In this manner the subsequent higher temperature will cross-link the rubber phase after a higher level of dispersion has been accomplished. Using these processes a variety of shaped or molded articles may be produced from the compositions of the invention. Examples of such articles include, but are not restricted to, hoses, gaskets, films, belts, cable jackets, seals, gears and bearings.

The dynamically cross-linked thermoplastic elastomer compositions according to the present invention can be advantageously modified by the addition of various types of fillers, pigments, coloring agent, heat and UV stabilizers, antioxidants, mold release agents, branching agents and the like as generally known in the art. Preferably the melt processible thermoplastic elastomeric composition is stabilized with a combination of polyamide and antioxidant as taught in U.S. Pat. No. 3,896,078, herein incorporated by reference.

Examples of a filler include calcium carbonate, calcium silicate, clay, kaolin, talc, silica, diatomaceous earth, mica powder, asbestos, alumina, barium sulfate, aluminum sulfate, calcium sulfate, basic magnesium carbonate, molybdenum disulfide, graphite, carbon black, carbon fiber and the like. The preferred filler is a carbon black. The amount of a filler should not impair the fluidity and mechanical strengths of the composition. The preferred amount of filler is in the range of 0.1 to 10 wt % of total composition.

EXAMPLES

The following examples are presented to illustrate in invention and are not intended to be limiting. All percentages, parts, etc. are by weight unless otherwise indicated. Shore D hardness was determined for polyether ester elastomers, and Shore A hardness was determined for melt processable blends according to ASTM D 2240-5. Compression set for blends was tested according to ASTM D395-89, Test Method B—Compression Set Under Constant Deflection in Air.

Soft segment glass transition temperature ($T_g$), hard segment melt temperature ($T_m$) and crystallization temperature ($T_c$) of polyether ester elastomer and its blend elastomer were determined using the procedure of the American Society for Testing Materials ASTM D-3418 (1988) using a DuPont DSC Instrument Model 2100 DuPont), according to the manufacturer's instructions. The heating and cooling rates were 10° C. per minute. All of the polymer samples were heated first, then cooled and heated again. The reported values for $T_c$ is from first cool and the reported values for $T_g$ and $T_m$ are from second heat. Whenever the polymer has more than one melting peak, the reported $T_m$ value is for a major melt peak.

Example 1

This example illustrates preparation of poly(trimethylene ether-tetramethylene terephthalate) elastomer.

The polymer was prepared using a batch process from dimethyl terephthalate, 1,4-butanediol and polytrimethylene ether glycol. An autoclave reactor equipped with an agitator, vacuum jets and a distillation still was charged with 14.7 kg (32.4 lbs) of dimethyl terephthalate, 17.2 kg (37.9 lbs) of 1,4-butanediol, and 15.0 kg (33.1 lbs) of polytrimethylene ether glycol of number average molecular weight 2,000. Tetraisopropyl titanate polymerization catalyst (50.3 g) and ETHANOX antioxidant (93.8 g) were also charged to this reactor. The temperature of the reactor was gradually raised to 210° C. and approximately 4.5 kg of methanol distillate were recovered. The reaction was continued further at 250° C. and under reduced pressure for 3 hours to increase molecular weight. The resulting polymer was extruded from the reactor and converted into pellets. The pellets were dried at 80-90° C. under reduced pressure overnight before use. The properties of this elastomer are reported in Table 1.

Example 2

Poly(trimethylene ether-tetramethylene terephthalate) was prepared as described for Example 1, with the exception that the number average molecular weight of the polytrimethylene ether glycol used was 2,390. The amounts of ingredients used were: dimethyl terephthalate, 12.52 kg; 1,4-butanediol, 14.90 kg; polytrimethylene ether glycol, 13.0 kg; tetraisopropyl titanate, 43.3 g; and ETHANOX, 80.8 g. The properties of the elastomer are reported in Table 1.

For comparison, Table 1 also contains data for two commercial HYTREL® thermoplastic polymers (DuPont). The HYTREL® thermoplastic polymers are block copolymers consisting of a hard (crystalline) segment of polybutylene terephthalate and a soft (amorphous) segment based on long chain polyether glycols.

TABLE 1

Properties of the Elastomer

| Example | Polyether ester Elastomer | Shore D Hardness | Soft segment $T_g$ (° C.) | Hard segment $T_m$ (° C.) | Hard segment $T_c$ (C.) |
|---|---|---|---|---|---|
| 1 | Poly(trimethylene ether-tetramethylene terephthalate) | 40 | −66.0 | 204.5 | 154.2 |
| 2 | Poly(trimethylene ether-tetramethylene terephthalate) | 42 | −69.1 | 210.9 | 156.4 |
|  | HYTREL ® 4056 thermoplastic polymer | 40 | −55.4 | 148.0 | 68.4 |
|  | HYTREL ® 5556 thermoplastic polymer | 55 | −50.4 | 199.6 | 139.9 |

$T_g$ = glass transition temperature
$T_m$ = melt temperature
$T_c$ = crystallization temperature
The elastomer hard segment block has major and minor melt peaks, the minor peak melting slightly above the temperature of the major one.

As shown in Table 1, the polytrimethylene ether ester elastomers were found to have the desired unique combination of properties. They have significantly lower hardness, and the hard segment blocks have higher melt temperature than either of the commercial controls. The hard segment block of the elastomer also has higher crystallization temperature, a desirable property for high service temperature use. The soft segment block has significantly lower glass transition temperature and thus provides better elastomer characteristics.

Examples 3 and 4

Vucanizate compositions listed below in Table 2 were made in a continuous process on a twin screw extruder. Crosslinking chemicals were blended with the ethylene/methyl acrylate copolymer (37 wt. % ethylene/63 wt. % methyl acrylate, melt index ~15 g/10 min. at 190° C.) rubber at a low enough temperature (~100° C.) that there was no reaction. The polyether ester (Example 1) was then dispersed and the temperature gradually increased to ~250° C. through a series of kneading blocks in the extruder, and the poly(ethylene/methyl acrylate) copolymer was crosslinked during the mixing process using 2,5-dimethyl-2,5-di-(tert-butylperoxy),hexyne-3 (DYBP) and a coagent diethylene glycol dimethacrylate (DEGDM) cure system (dynamic vulcanization). The polyether ester became the continuous phase and the polyethylene/methyl acrylate copolymer the crosslinked, dispersed rubber phase. The resulting product had rubber-like properties, but could be molded and extruded like a thermoplastic.

Samples were injection molded using barrel temperatures of about 225° C. Plaques (⅛″) were made for compression set testing, and microtensile bars (⅛″) for evaluation of tensile properties.

The blends of Comparative Examples 5 and 6 were obtained using the commercially available HYTREL® 5556 thermoplastic polymer (available from DuPont) and the ethylene/methyl acrylate copolymer described above in Examples 3 and 4.

TABLE 2

Blend Compositions

| Exp. No. | Polyether Ester Elastomer | Wt. % Elastomer | Wt. % Dispersed Phase | DEGDM (wt. %) | DYBP (wt. %) |
|---|---|---|---|---|---|
| 3 | Product of Example 1 | 50 | 45.5 | 4.5 | 2.5 |
| 4 | Product of Example 1 | 25 | 71.5 | 4.5 | 2.5 |
| Comp 5 | HYTREL ® 5556 thermoplastic polymer | 50 | 45.5 | 4.5 | 2.5 |
| Comp 6 | HYTREL ® 5556 thermoplastic polymer | 25 | 71.5 | 4.5 | 2.5 |

TABLE 3

Injection Molded Product Properties

| Exp. No. | Shore A hardness | Soft Seg. Tg (° C.) | Hard Seg. Tm (° C.) | Hard Seg. Tc (° C.) | Stress @ Max Load (psi) | Stress @ 100% (psi) | Max Strain (%) | Compression Set as Molded (%) |
|---|---|---|---|---|---|---|---|---|
| 3 | 73 | −33.1 | 207.6 | 174.5 | 745 | 595 | 222 | 63 |
| 4 | 52 | −30.5 | 209.5 | 173.1 | 378 | 292 | 235 | 40 |
| Comp 5 | 85 | −29.9 | 203.9 | 172.8 | 1060 | 988 | 168 | 65 |
| Comp 6 | 61 | −28.2 | 205 | 170.0 | 478 | 396 | 196 | 44 |

The data in Table 3 indicate that the blends of the present invention (Examples 3 and 4) provide much softer elastomers (Shore A hardness of 73 and 52 for Examples 3 and 4 respectively, compared to 85 and 61 for Comparative Examples 5 and 6) with improved compression set (63% and 40% for Examples 3 and 4 respectively, compared to 65% and 44% for Comparative Examples 5 and 6). In addition, comparison of the products of Example 3 and Comparative Example 6 indicate that the blend of the present invention has better elastic properties (maximum strain of 222% for Example 3 compared to 196% for Comparative Example 6) in spite of its higher hardness. Thus, it can be seen that the thermoplastic elastomeric compositions of the invention have the unique and unexpected combination of lower hardness (greater softness), greater elasticity, and can be used at higher temperatures comparable to HYTREL thermoplastic polymers containing other soft segments.

What we claim is:

1. A curable thermoplastic elastomeric composition comprising:
    (a) polytrimethylene ether ester elastomer;
    (b) crosslinkable poly(meth)acrylate rubber; and
    (c) a crosslinking system to crosslink the rubber.

2. The curable thermoplastic elastomeric composition of claim 1 wherein the polytrimethylene ether ester elastomer comprises polytrimethylene ether ester soft segment and polyalkylene phthalate hard segment.

3. The curable thermoplastic elastomeric composition of claim 2 comprising from about 15 to about 75 wt. % of the polytrimethylene ether ester elastomer and from about 25 to about 85 wt. % of the crosslinkable poly(meth)acrylate rubber.

4. The curable thermoplastic elastomeric composition of claim 1 wherein the crosslinkable poly(meth)acrylate rubber is selected from the group consisting of poly alkyl (meth)acrylate rubber, ethylene/alkyl (meth)acrylate copolymer rubber and polyperfluoroalkylacrylate rubber.

5. The curable thermoplastic elastomeric composition of claim 1 wherein the crosslinking system comprises a peroxide free radical initiator in combination with an organic multiolefinic coagent.

6. The curable thermoplastic elastomeric composition of claim 1 wherein the polytrimethylene ether glycol has number average molecular weight of at least about 1,000.

7. The curable thermoplastic elastomeric composition of claim 2 wherein the polytrimethylene ether glycol has number average molecular weight of from about 1,000 to about 5,000.

8. The curable thermoplastic elastomeric composition of claim 3 wherein:
    (a) the polytrimethylene ether ester elastomer has a number average molecular weight of from about 1,000 to about 5,000 and is a block copolymer comprising from about 10 to about 90 wt. % poly(trimethylene ether) terephthalate soft segment and from about 90 to about 10 wt. % polyalkylene phthalate hard segments selected from the group consisting of poly (ethylene terephthalate), poly(trimethylene terephthalate), poly (butylene terephthalate), and copolymers and mixtures thereof;
    (b) wherein the curable thermoplastic elastomeric composition comprising from about 15 to about 75 wt. % of the elastomer and from about 25 to about 85 wt. % of the crosslinkable poly(meth)acrylate rubber;
    (c) the crosslinkable poly(meth)acrylate rubber is selected from the group consisting of poly alkyl (meth)acrylate rubber, ethylene/alkyl (meth)acrylate copolymer rubber and polyperfluoroalkylacrylate rubber; and
    (d) the crosslinking system comprises a peroxide free radical initiator in combination with an organic multi-olefinic coagent.

9. The curable thermoplastic elastomeric composition of claim 2 wherein the polytrimethylene ether ester elastomer is a block copolymer of segments of poly(trimethylene ether) terephthalate soft segments and poly(butylene terephthalate) hard segments.

10. The curable thermoplastic elastomeric composition of claim 2 wherein the polytrimethylene ether ester elastomer is a block copolymer of segments of poly(trimethylene ether) terephthalate soft segments and poly(ethylene terephthalate) hard segments.

11. The curable thermoplastic elastomeric composition of claim 2 wherein the polytrimethylene ether ester elastomer is a block copolymer of segments of poly(trimethylene ether) terephtalate soft segments and poly(trimethylene terephthalate) hard segments.

12. The curable thermoplastic elastomeric composition of claim 2 wherein the polytrimethylene ether ester elastomer is prepared by providing and reacting (a) polytrimethylene ether glycol, (b) diol comprising a member of the group consisting of 1,4-butanediol, 1,3-propanediol and ethylene glycol, and (c) terephthalic acid, ester, acid halide or acid anhydride.

13. The curable thermoplastic elastomeric composition of claim 12 wherein the polytrimethylene ether glycol is produced by polycondensation of diol comprising 75 to 100 wt. % 1,3-propanediol and 25 to 0 wt % other diols having from 2 to 12 carbon atoms.

14. The curable thermoplastic elastomeric composition of claim 13 wherein the other diols are selected from the group consisting of 1,4-butanediol and ethylene glycol.

15. A melt processible thermoplastic elastomeric composition comprising:
(a) an continuous phase comprising polytriethylene ether ester elastomer; and
(b) crosslinked poly(meth)acrylate rubber disperse phase.

16. A process for manufacturing a melt processible thermoplastic elastomeric composition as set forth in claim 15, comprising the steps:
(a) providing cross-linkable poly(meth)acrylate rubber,
(b) providing crosslinking system in an amount effective to crosslink the poly(meth)acrylate rubber,
(c) providing polytrimethylene ether ester elastomer;
(d) forming a mixture of the cross-linkable poly(meth)acrylate rubber, the polytrimethylene ether ester elastomer and the crosslinking system;
(e) cross-linking the cross-linkable poly(meth)acrylate rubber in the mixture using the crosslinking system; and
(f) recovering a melt processible thermoplastic elastomeric composition comprising the polyether ester elastomer as a continuous phase and the crosslinked poly(meth)acrylate rubber as a disperse phase.

17. The process of claim 16 wherein the crosslinking system comprises a peroxide free radical initiator in combination with an organic multiolefinic coagent.

18. The melt processible thermoplastic elastomeric composition of claim 17 wherein the polyether ester elastomer has a Shore D hardness of 50 or less and wherein the Tm of the hard segment is at least 200° C. prior to blending.

19. The process of claim 17 wherein the crosslinking is carried out during extrusion or injection molding of the melt processible thermoplastic elastomeric composition.

20. The process of claim 17 wherein the free radical initiator is selected from the group consisting of 2,5-dimethyl-2,5-di-(t-butylperoxy) hexyne-3, t-butyl peroxybenzoate, 2,5-dimethyl-2,5-di-(t-butylperoxy)-2,5-dimethylhexane, dicumyl peroxide, α, α-bis(t-butylperoxy)-2,5-dimethylhexane, and mixtures thereof.

21. The process of claim 17 wherein the organic multiolefinic co-agent is selected from the group consisting of diethylene glycol diacrylate, ethylene glycol dimethacrylate, diethylene glycol dimethacrylate, polyethylene glycol dimethacrylate, N,N'-m-phenylene dimaleimide, and triallylisocyanurate.

22. The process of claim 20 wherein the organic multiolefinic co-agent is selected from the group consisting of diethylene glycol diacrylate, ethylene glycol dimethacrylate, diethylene glycol dimethacrylate, polyethylene glycol dimethacrylate, N,N'-m-phenylene dimaleimide, and triallylisocyanurate.

23. A shaped article made from a melt processible thermoplastic elastomeric composition as set forth in claim 15.

24. The shaped article of claim 23 which is made in a mold.

25. The shaped article of claim 23 wherein the shaped article is selected from the group consisting of hoses, gaskets, films, belts, cable jackets, seals, gears and bearings.

26. A process of preparing a shaped article as set forth in claim 23, comprising:
(a) providing:
i) polytrimethylene ether ester elastomer;
ii) crosslinkable poly(meth)acrylate rubber; and
iii) a crosslinking system to crosslink the rubber; and
b) forming a shaped article by extruding or molding the melt processible thermoplastic elastomeric composition.

27. The process of claim 26 wherein the forming a shaped article is carried out by extrusion or injection molding of the melt processible thermoplastic elastomeric composition.

* * * * *